(12) United States Patent
Maruyama (10) Patent No.: US 11,225,233 B2
(45) Date of Patent: Jan. 18, 2022

(54) BRAKING CONTROL APPARATUS FOR A COMBINATION VEHICLE

(71) Applicant: TOYOTA JIDOSHA KABUSHIKI KAISHA, Toyota (JP)

(72) Inventor: Shun Maruyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 16/435,786

(22) Filed: Jun. 10, 2019

(65) Prior Publication Data

US 2019/0381980 A1    Dec. 19, 2019

(30) Foreign Application Priority Data

Jun. 15, 2018    (JP) .............................. JP2018-114371

(51) Int. Cl.
 *B60T 8/24* (2006.01)
 *B60T 8/1755* (2006.01)
 *B60T 7/20* (2006.01)
 *B60T 8/17* (2006.01)

(52) U.S. Cl.
 CPC .............. *B60T 8/1755* (2013.01); *B60T 7/20* (2013.01); *B60T 8/1705* (2013.01)

(58) Field of Classification Search
 CPC .................................................. B60T 2230/06
 See application file for complete search history.

(56) References Cited

U.S. PATENT DOCUMENTS

| 4,804,237 A | 2/1989 | Gee et al. |
| 6,705,684 B1 * | 3/2004 | Garvey ..................... B60T 7/20 303/123 |
| 7,904,222 B2 | 3/2011 | Lee et al. |
| 9,290,204 B2 | 3/2016 | Lavoie |
| 2002/0107627 A1 * | 8/2002 | Funke ................. B60T 8/17554 701/70 |
| 2002/0189889 A1 * | 12/2002 | Demerly ................. B60T 8/885 180/402 |

(Continued)

FOREIGN PATENT DOCUMENTS

| JP | 8-91186 A | 4/1996 |
| JP | 2011-068248 A | 4/2011 |

(Continued)

*Primary Examiner* — Robert A. Siconolfi
*Assistant Examiner* — Stephen M Bowes
(74) *Attorney, Agent, or Firm* — Sughrue Mion, PLLC (57) ABSTRACT

A braking control apparatus for a combination vehicle including a tractor vehicle and a trailer vehicle coupled to each other comprises a braking device that applies braking forces to wheels and a control unit that controls the braking device. The control unit performs behavior control to stabilize behavior of the tractor vehicle by applying a braking force or braking forces to a predetermined wheel or wheels of the tractor vehicle when turning behavior of the tractor vehicle is not stable, and, when the control unit applies a braking force or braking forces to a predetermined wheel or wheels, applies braking forces to the wheels of the trailer vehicle which are according to a force acting on the trailer vehicle by the tractor vehicle due to the application of the braking force or braking forces being applied to the predetermined wheel or wheels of the tractor vehicle.

4 Claims, 7 Drawing Sheets

(56) References Cited

U.S. PATENT DOCUMENTS

| | | | |
|---|---|---|---|
| 2006/0187008 A1* | 8/2006 | Yu | B60D 1/58 340/431 |
| 2011/0029210 A1* | 2/2011 | Wu | B60D 1/58 701/70 |
| 2012/0029782 A1 | 2/2012 | Suda | |
| 2013/0179004 A1 | 7/2013 | Nihei et al. | |
| 2014/0200786 A1* | 7/2014 | Morselli | B60T 8/1708 701/74 |
| 2014/0288769 A1 | 9/2014 | Trombley et al. | |
| 2015/0165850 A1* | 6/2015 | Chiu | B60D 1/62 701/41 |
| 2016/0251005 A1* | 9/2016 | Morselli | B60T 7/20 701/50 |

FOREIGN PATENT DOCUMENTS

| | | |
|---|---|---|
| JP | 2012-066659 A | 4/2012 |
| WO | 2010087022 A1 | 8/2010 |

* cited by examiner

Prior Art

FIG.6A    FIG.6B

Prior Art

FIG.7

BRAKING CONTROL APPARATUS FOR A COMBINATION VEHICLE

CROSS-REFERENCE TO RELATED APPLICATION

This application claims priority to Japanese Patent Application No. JP2018-114371 filed on Jun. 15, 2018, incorporated by reference in its entirety.

BACKGROUND

1. Technical Field

The present disclosure relates to a braking control apparatus for a combination vehicle that includes a tractor vehicle and a trailer vehicle coupled thereto.

2. Description of the Related Art

A combination vehicle comprises a tractor vehicle and a trailer vehicle. The trailer vehicle is coupled to the tractor vehicle pivotally about a hitch point relative to the tractor vehicle as viewed from above by a coupling device. Wheels of the trailer vehicle are non-steered driven wheels, and braking forces of those wheels are controlled by a braking control apparatus that controls braking forces of wheels of the tractor vehicle.

In a combination vehicle, it is known that behavior of a tractor vehicle is stabilized by applying a braking force or braking forces to a wheel or wheels of the tractor vehicle when the behavior of the tractor vehicle becomes unstable. For example, in Japanese Patent Application Laid-open Publication No. 2011-68248, a braking control apparatus is described which is configured to estimate a lateral force acting on a hitch point and, when the behavior of the trailer vehicle is unstable and the lateral force is high, apply braking forces to the wheels of a trailer vehicle such that a yaw moment is generated which causes a force in the direction opposite to the lateral force to act on the hitch point.

In a combination vehicle as well, a tractor vehicle may be in a spin state or a drift-out state in a situation where the vehicle turns while running on a traveling path having a road surface with a low coefficient of friction. Therefore, also in a combination vehicle, it is known to perform behavior control that stabilizes the turning behavior of the tractor vehicle when the turning behavior of the tractor vehicle deteriorates. For example, it has been known that when the tractor vehicle is in a spin state, spin suppression control is performed to apply a braking force to a turning outer front wheel, and when the tractor vehicle is in a drift-out state, drift-out suppression control is performed to apply braking forces to left and right rear wheels.

When a braking force is applied to a predetermined wheel of the tractor vehicle by behavior control in a situation where a combination vehicle turns, the tractor vehicle is decelerated, so that an acting force resulting from a difference in deceleration between the tractor vehicle and the trailer vehicle is exerted on the trailer vehicle from the tractor vehicle via a hitch point. As a result, the tractor vehicle receives a reaction force of the acting force from the trailer vehicle, and the reaction force pushes a rear end of the tractor vehicle diagonally forward and increases a yaw rate of the tractor vehicle, so that a hitch angle may become excessive. Notably, the braking control apparatus described in the Laid-open Publication described above cannot prevent a hitch angle of a combination vehicle from becoming excessive.

SUMMARY

The present disclosure provides a braking control apparatus for a combination vehicle which is improved to reduce, compared to the prior art, the possibility of a hitch angle of the combination vehicle becoming excessive in a situation where a braking force or braking forces is applied to a wheel or wheels of a tractor vehicle by behavior control and turning behavior of the tractor vehicle is stabilized.

According to the present disclosure, a braking control apparatus for a combination vehicle is provided which includes a tractor vehicle and a trailer vehicle coupled to the tractor vehicle by a coupling device pivotally relative to the tractor vehicle as viewed from above, the braking control apparatus comprising a braking device that applies braking forces to wheels of the tractor vehicle and wheels of the trailer vehicle, and a control unit that controls the braking device, and the control unit being configured to perform behavior control for stabilizing turning behavior of the tractor vehicle by applying a braking force or braking forces to a predetermined wheel or wheels of the tractor vehicle when the turning behavior of the tractor vehicle is not stable.

The control unit is configured to control the braking device such that when a braking force or braking forces is applied to a predetermined wheel or wheels by the behavior control, braking forces according to a force that the tractor vehicle acts on the trailer vehicle through the coupling device due to the application of the braking force or braking forces to the predetermined wheel or wheels are applied to the wheels of the trailer vehicle.

During turning of a combination vehicle, when a braking force or braking forces is applied to a predetermined wheel or wheels of a tractor vehicle by behavior control, the tractor vehicle decelerates relative to a trailer vehicle, so that the tractor vehicle exerts an acting force on the trailer vehicle through a coupling device. As a result, the trailer vehicle applies a reaction force of the acting force to the tractor vehicle through the coupling device, and the reaction force pushes a rear end of the tractor vehicle diagonally forward toward the turning outside, so that it generates a yaw moment in the direction to promote turning of the tractor vehicle, and the hitch angle of the combination vehicle is increased. Therefore, by reducing the force with which the trailer vehicle presses the rear end of the tractor vehicle diagonally forward, it is possible to reduce the possibility that the hitch angle of the combination vehicle increases and becomes excessive.

According to the above configuration, when a braking force or braking forces is applied to a predetermined wheel or wheels by behavior control, braking forces according to a force that the tractor vehicle acts on the tractor vehicle through the coupling device due to the application of the braking force or braking forces to the predetermined wheel or wheels are applied to the wheels of the trailer vehicle. Consequently, a difference in deceleration between the tractor vehicle and the trailer vehicle is smaller than when braking forces are not applied to the wheels of the trailer vehicle, and an acting force exerted by the tractor vehicle on the trailer vehicle through the coupling device and a reaction force thereof are reduced. Therefore, a yaw moment generated in the direction to promote turning of the tractor vehicle by the reaction force is also reduced, so that the possibility that a hitch angle of the combination vehicle increases and becomes excessive can be reduced.

In one aspect of the present disclosure, the control unit is configured to estimate a force acting in the front-rear direction of the trailer vehicle through the coupling device due to the application of a braking force or braking forces to the predetermined wheel or wheels and control the braking device such that a sum of braking forces applied to the wheels of the trailer vehicle is less than or equal to the force acting in the front-rear direction.

When a sum of braking forces applied to the wheels of the trailer vehicle exceeds a force acting in the front-rear direction, the trailer vehicle exerts a force to decelerate the tractor vehicle through the coupling device. Therefore, there is a possibility that the hitch angle of the combination vehicle may be reduced and become too small, and there is also a possibility that stabilization of the turning behavior of the tractor vehicle may not be properly performed due to excessive deceleration of the tractor vehicle.

According to the above aspect, a force acting in the front-rear direction of the trailer vehicle through the coupling device due to the application of a braking force or braking forces to the predetermined wheel or wheels is estimated, and the braking device is controlled such that a sum of braking forces applied to the wheels of the trailer vehicle is less than or equal to the force acting in the front-rear direction. Therefore, while avoiding that turning behavior of the tractor vehicle is not stabilized appropriately due to excessive deceleration of the tractor vehicle, it is possible to reduce the possibility that a hitch angle of the combination vehicle becomes excessive.

In particular, if the braking device is controlled such that the sum of the braking forces applied to the wheels of the trailer vehicle is the same as the force acting in the front-rear direction between the tractor vehicle and the trailer vehicle through the coupling device, the force acting in the front-rear direction is zero. Therefore, it is possible to prevent the hitch angle of the combination vehicle from increasing and becoming excessive without inhibiting the stabilization of the turning behavior of the tractor vehicle by the behavior control.

In another aspect of the present disclosure, the control unit is configured to calculate a hitch angle of the combination vehicle, calculate a yaw moment acting around a center of gravity of the tractor vehicle due to the application of a braking force or braking forces to the predetermined wheel or wheels, and calculate a force acting in the front-rear direction based on the hitch angle and the yaw moment.

According to the above aspect, a hitch angle of the combination vehicle is calculated, a yaw moment acting around the center of gravity of the tractor vehicle due to the application of the braking force or braking forces to the predetermined wheel or wheels is calculated, and a force acting in the front-rear direction of the trailer vehicle is calculated based on the hitch angle and the yaw moment.

Consequently, for example, a force acting in the front-rear direction of the trailer vehicle can be calculated more accurately than when a force acting in the front-rear direction of the trailer vehicle is calculated as a component of the braking force or braking forces applied to the predetermined wheel or wheels. Therefore, braking forces applied to the wheels of the trailer vehicle can be appropriately controlled, and the possibility of the hitch angle becoming excessive can be appropriately reduced.

In another aspect of the present disclosure, the control unit is configured to calculate a yaw moment based on a braking force or braking forces of the predetermined wheel or wheels and lateral forces of the wheels of the tractor vehicle when the braking force or braking forces is applied to the predetermined wheel or wheels.

According to the above aspect, a yaw moment is calculated based on a braking force or braking forces of the predetermined wheel or wheels and lateral forces of the wheels of the tractor vehicle when the braking force or braking forces is applied to the predetermined wheel or wheels. Therefore, as compared to where a yaw moment is calculated without considering lateral forces of the wheels of the tractor vehicle, a force acting in the front-rear direction of the trailer vehicle can be more accurately calculated and the possibility of the hitch angle becoming excessive can be more appropriately reduced.

In another aspect of the present disclosure, the trailer vehicle has left and right wheels, and the same braking forces are applied to the left and right wheels.

According to the above aspect, the same braking forces are applied to the left and right wheels of the trailer vehicle. Consequently, no yaw moment is given to the trailer vehicle by the braking forces applied to the left and right wheels of the trailer vehicle. Therefore, it is possible to prevent that a yaw moment to be given to the tractor vehicle by the behavior control is adversely affected by applying braking forces to the wheels of the trailer vehicle and the behavior control is not appropriately performed.

Other objects, other features and attendant advantages of the present disclosure will be readily understood from the description of the embodiments of the present disclosure described with reference to the following drawings.

DETAILED DESCRIPTION

The present disclosure now be described in detail with reference to the accompanying drawings.

Figure 1:
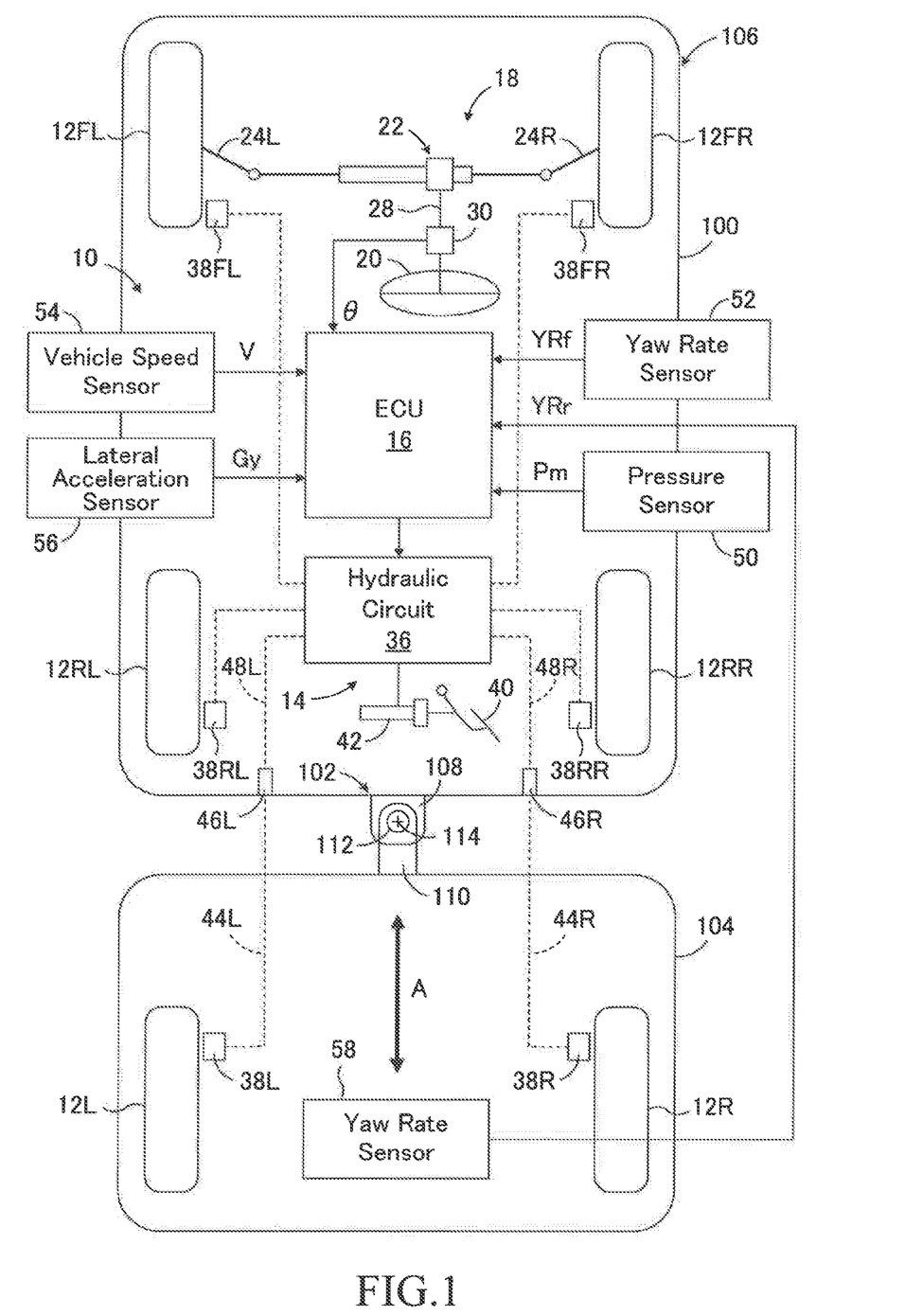
FIG. 1 is a schematic plan view showing a combination vehicle to which an embodiment of a braking control apparatus according to the present disclosure is applied in a straight-ahead state.

In FIG. 1, a braking control apparatus 10 according to the embodiment is applied to a combination vehicle 106 that includes a tractor vehicle 100 and a trailer vehicle 104 coupled to the tractor vehicle by a coupling device 102 so as to be pivotable relative to the tractor vehicle as viewed from above. The braking control apparatus 10 includes a braking device 14 and an electronic control unit 16 that functions as a control unit that controls the braking device. In the following description and FIG. 1, the "electronic control unit" is described as "ECU".

The braking device 14 applies braking forces to left and right front wheels 12FL and 12FR and left and right rear wheels 12RL and 12RR of the tractor vehicle 100, and applies braking forces to left and right wheels 12L and 12R of the trailer vehicle 104. In the illustrated embodiment, the wheels of the trailer vehicle 104 are a pair of left and right wheels 12L and 12R, but the trailer vehicle may have a plurality of sets of left and right wheels. Note that at least one of the front wheels and the rear wheels of the tractor vehicle 100 are driving wheels, and the left and right wheels 12L and 12R of the tractor vehicle 104 are non-steered driven wheels.

The coupling device 102 includes a hitch 108 provided at the center of the rear end of the tractor vehicle 100, a bracket 110 provided at the center of the front end of the trailer vehicle 104, and a kingpin 112 connecting the hitch 108 and bracket 110. The kingpin 112 has a pivot axis 114 extending vertically, and the tractor vehicle 100 and the trailer vehicle 104 are pivotable about the pivot axis 114 relative to one another. The coupling device 102 is configured to be able to release the coupling of the tractor vehicle 100 and the trailer vehicle 104 as needed.

The tractor vehicle 100 has a steering device 18 for steering the left and right front wheels 12FL and 12FR. The steering device 18 steers the left and right front wheels 12FL and 12FR through the tie rods 24L and 24R by a rack and pinion device 22 driven in response to an operation of a steering wheel 20 by a driver. Although not shown in FIG. 1, the steering device 18 may include a power steering device.

As shown in FIG. 1, a steering shaft 28 of the steering device 18 is provided with a steering angle sensor 30 for detecting a rotation angle of the shaft as a steering angle θ. The steering angle sensor 30 detects a steering angle θ with the steering angle corresponding to straight traveling of the tractor vehicle 100 as zero, and steering angles in a left turning direction and a right turning direction as positive and negative values, respectively.

The braking device 14 includes a hydraulic circuit 36, wheel cylinders 38FL, 38FR, 38RL and 38RR respectively provided on the wheels 12FL, 12FR, 12RL and 12RR of the tractor vehicle 100, and a master cylinder 42. Master cylinder 42 pumps brake oil in response to the driver's depression operation of a brake pedal 40. Although not shown in FIG. 1, the hydraulic circuit 36 includes a reservoir, an oil pump, various valve devices, etc., and functions as a brake actuator.

Further, the braking device 14 includes wheel cylinders 38L and 38R provided on the left and right wheels 12L and 12R of the trailer vehicle 104. Conduits 44L and 44R connected to the wheel cylinders 38L and 38R are disconnectably connected to conduits 48L and 48R connected to the hydraulic circuit 36 by connectors 46L and 46R, respectively.

The pressures in the wheel cylinders 38FL-38RR, 38L and 38R are controlled in accordance with a pressure in the master cylinder 42 which is normally driven in response to the driver's depression of brake pedal 40, i.e, a master cylinder pressure Pm. Further, the pressure in each of the wheel cylinders 38FL to 38RR, 38L and 38R is controlled irrespective of the depression amount of the brake pedal 40 by the driver by controlling the oil pump of the hydraulic circuit 36 and various valve devices as needed by the ECU 16. Thus, the braking device 14 can control the braking forces of the wheels 12FL to 12RL of the tractor vehicle 100 independently of each other, and can control the braking forces of the left and right wheels 12L and 12R of the tractor vehicle 104 independently of the braking forces of the wheels 12FL to 12RR.

The master cylinder 42 is provided with a pressure sensor 50 for detecting a master cylinder pressure Pm, and a signal indicating a master cylinder pressure Pm detected by the pressure sensor 50 is input to the ECU 16. The ECU 16 controls the braking pressures of the wheels, that is, the pressures in the wheel cylinders 38FL to 38RR, 38L and 38R based on the master cylinder pressure Pm, whereby controls the braking force of each wheel in accordance with a depression operation amount of the brake pedal 40, that is, a braking operation amount of the driver. In this connection, the braking forces of the wheels 12L and 12R of the trailer vehicle 104 are controlled so as to control decelerations of the tractor vehicle 100 and the trailer vehicle 104 at the coupling device 102 to be substantially the same such that an excessive force does not act between the tractor vehicle 100 and the tractor vehicle 104 through the coupling device 102.

Signals indicating a steering angle θ and an actual yaw rate YRf of the tractor vehicle 100 are input to the ECU 16 from the steering angle sensor 30 and a yaw rate sensor 52, respectively. Further, the ECU 16 receives signals indicating a vehicle speed V and a lateral acceleration Gy of the tractor vehicle 100 from a vehicle speed sensor 54 and a lateral acceleration sensor 56, respectively. Similar to the steering angle sensor 30, the yaw rate sensor 52 and the lateral acceleration sensor 56 respectively detect an actual yaw rate YRf and a lateral acceleration Gy with the yaw rate and the lateral acceleration corresponding to straight traveling of the tractor vehicle 100 as zero, and yaw rates and lateral accelerations in a left turning direction and a right turning direction as positive values and negative values, respectively.

In the illustrated embodiment, the trailer vehicle 104 is also provided with a yaw rate sensor 58. The yaw rate sensor 58 detects an actual yaw rate YRr with a yaw rate corresponding to straight traveling of the trailer vehicle 104 as zero and yaw rates in a left turning direction and a right turning direction as a positive value and a negative value, respectively. A signal indicating an actual yaw rate YRr of the trailer vehicle 104 is also input to the ECU 16.

As will be described in detail later, the ECU 16 determines whether or not turning behavior of the tractor vehicle 100 is deteriorated and it is necessary to apply a braking force or braking forces by behavior control. This determination is made for a spin state (excessive oversteer state) and a drift-out state (excessive understeer state). The ECU 16, when determines that an application of a braking force or braking forces by the behavior control is necessary, performs the behavior control that applies a braking force or braking forces to a predetermined wheel or wheels of the tractor vehicle 100 so as to stabilize turning behavior of the tractor vehicle, that is, the spin suppression control or drift-out suppression control.

In particular, in the spin suppression control, a braking force is applied to at least a turning outer front wheel or a braking force of the turning outer front wheel is increased, whereby a yaw moment in the turning suppression direction is applied to the tractor vehicle and the vehicle is decelerated. Further, in the drift-out suppression control, the tractor vehicle is decelerated by applying braking forces to at least the left and right rear wheels or increasing at least braking forces of the left and right rear wheels. Further, the braking force of the turning inner rear wheel is made higher than the braking force of the turning outer rear wheel, whereby a yaw moment in the turning promotion direction is applied to the tractor vehicle.

Further, the ECU 16, when performing application of a braking force or braking forces by the behavior control, control the braking device 14 such that braking forces according to the braking force or braking forces applied to a predetermined wheel or wheels of the tractor vehicle 100 by the behavior control is applied to the wheels 12L and 12R of the trailer vehicle 104. In particular, the ECU 16 estimates an acting force Fvfr (see FIGS. 4 to 6) exerted by the tractor vehicle 100 on the tractor vehicle 104 in the front-rear direction (the direction indicated by the arrow A in FIG. 1) through the coupling device 10 due to the braking force or braking forces applied to the predetermined wheel or wheels by the behavior control. Further, the ECU 16 controls braking forces Fl and Fr applied to the wheels 12L and 12R by the braking device 14 such that braking forces Fla and Fra each become Fvfr/2 and their sum Fla+Fra becomes Fvfr.

Although not shown in detail in FIG. 1, the ECU 16 includes a microcomputer and a drive circuit, and the microcomputer has a CPU, a ROM, a RAM and an input/output port device, and has a general configuration in which they are mutually connected by a bidirectional common bus. In particular, the ROM of the microcomputer stores a program for controlling the braking forces of the wheels 12L and 12R of the trailer vehicle 104 corresponding to the flowchart shown in FIG. 2 described later and a program of behavior control corresponding to the flowchart shown in FIG. 3. The CPU executes these programs to execute the control of the braking forces of the wheels 12L and 12R and the behavior control.

Figure 2:
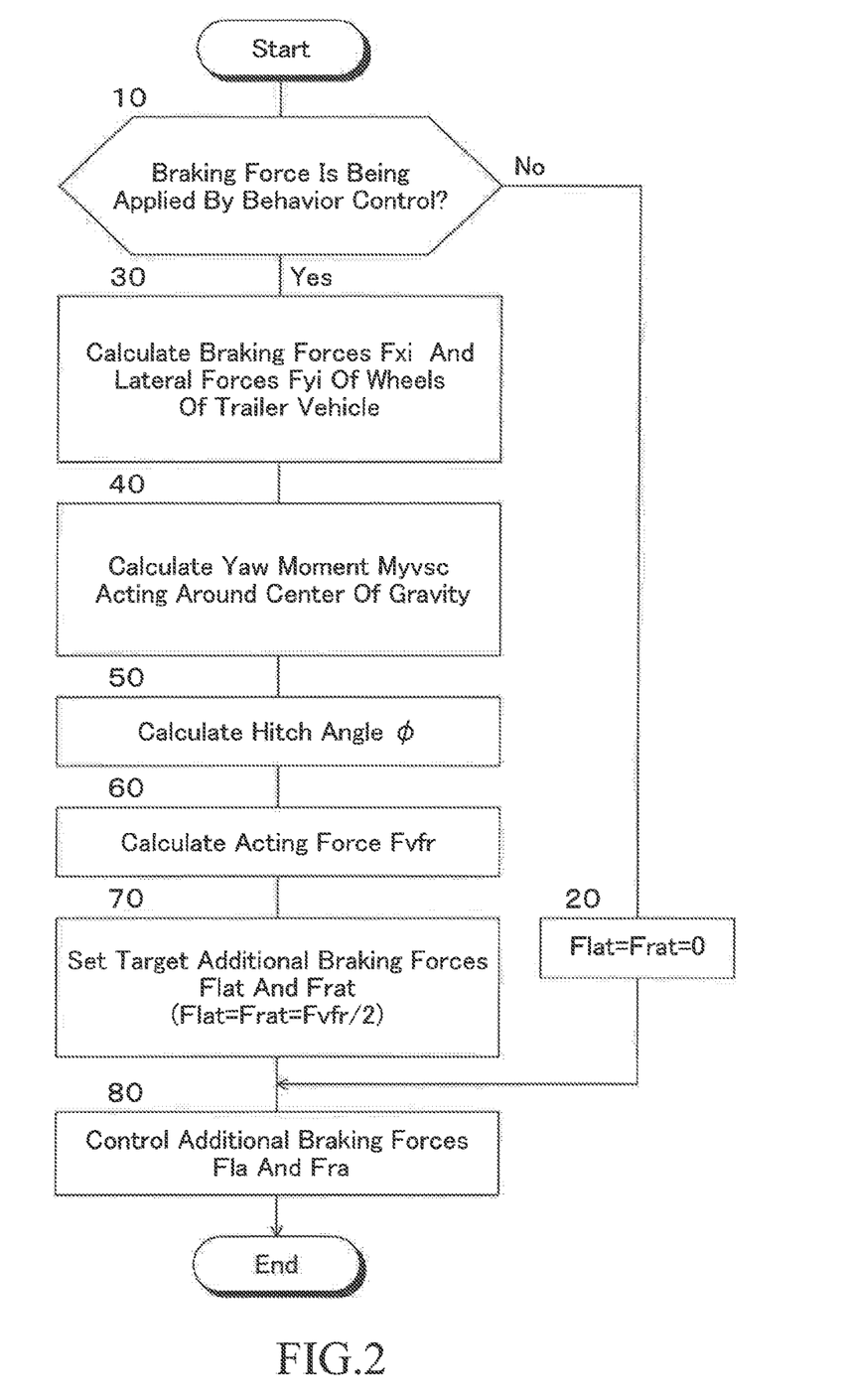
FIG. 2 is a flow chart showing a braking force control routine of wheels of a trailer vehicle in the embodiment.
Figure 3:
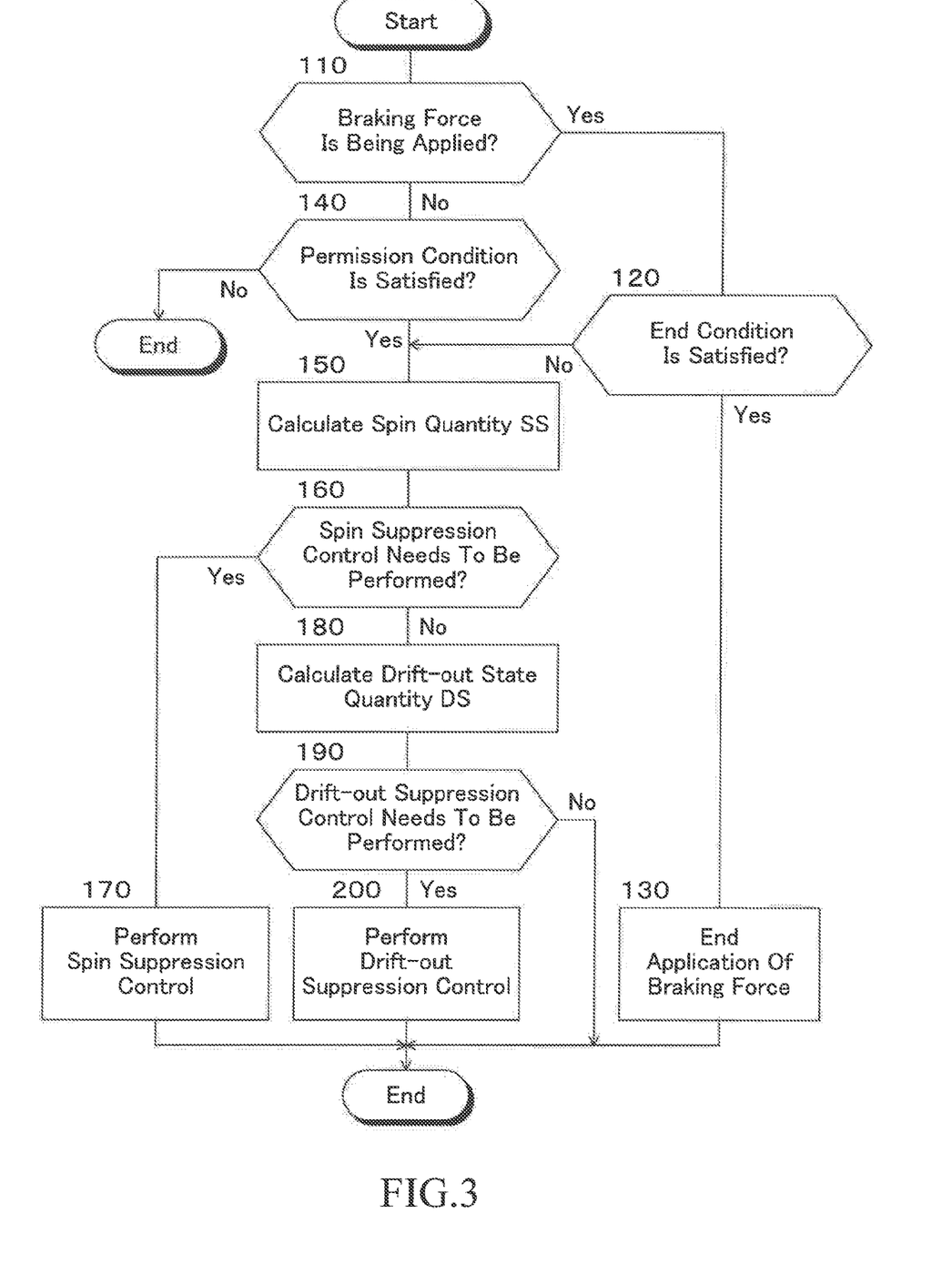
FIG. 3 is a flowchart showing a behavior control routine of a tractor vehicle in the embodiment.

The ECU 16 may include a plurality of microcomputers communicating information mutually, and the program corresponding to the flowchart shown in FIG. 2 and the program corresponding to the flowchart shown in FIG. 3 may be achieved by the corresponding microcomputers.

<Braking Force Control of Trailer Vehicle>

Next, the braking force control routine of the wheels of the trailer vehicle 104 in the embodiment will be described with reference to the flowchart shown in FIG. 2 and the plan view of the combination vehicle 106 when left turning shown in FIG. 4. Note that the control according to the flowchart shown in FIG. 2 (referred to as "braking force control") is repeatedly executed at predetermined time intervals by the microcomputer of the ECU 16 when an ignition switch not shown is ON.

First, in step 10, a determination is made as to whether or not a braking force or braking forces is being applied to a predetermined wheel or wheels of the tractor vehicle 100 by the behavior control. When an affirmative determination is made, the braking force control proceeds to step 30, and when a negative determination is made, the braking force control proceeds to step 20. It should be noted that even if a braking force or braking forces is applied to a wheel or wheels of the tractor vehicle 100, when the application of the braking force or braking forces is not by the behavior control but is caused by the driver's braking operation or vehicle control other than the behavior control, a negative determination is made.

In step 20, since it is not necessary to apply braking forces to wheels 12L and 12R of the trailer vehicle 104, target additional braking forces Flat and Frat of wheels 12L and 12R are set to zero, and then the braking force control proceeds to step 80.

In step 30, braking forces Fxi (i=fl, fr, rl and rr) of the wheels 12FL to 12RR of the tractor vehicle 100 are calculated based on the braking forces of predetermined wheels controlled according to the flowchart shown in FIG. 3. In addition, lateral forces Fyi (i=fl, fr, rl and rr) of the wheels 12FL to 12RR are calculated in a manner known in the art. Note that a braking force of the wheel to which a braking force is not added by the behavior control is calculated to zero, even if the wheel is braked. Further, the lateral force Fyi is a lateral force of each wheel when a braking force or braking forces is applied to a predetermined wheel or wheels by the behavior control.

In step 40, a yaw moment Myvsc acting around a center of gravity Og due to the braking forces Fxi and the lateral forces Fyi of the wheels 12FL to 12RR is calculated according to the following equation (1). As shown in FIG. 4, in the following equation (1), D is a tread of the tractor vehicle 100, and Lf and Lr are distances between the center of gravity Og of the tractor vehicle 100 and axles of the front and rear wheels, respectively.

$$Myvsc = D(Fyfl + Fyrl - Fyfr - Fyrr)/2 + Lr(Fyrl + Fyrr) - Lf(Fyfl + Fyfr) \quad (1)$$

In step 50, based on an actual yaw rate YRf of the tractor vehicle 100 and an actual yaw rate YRr of the trailer vehicle 104, a hitch angle $\varphi$ of the combination vehicle 106 is calculated according to the following equation (2).

$$\varphi = f(YRf - YRr)dt \quad (2)$$

Figure 4:
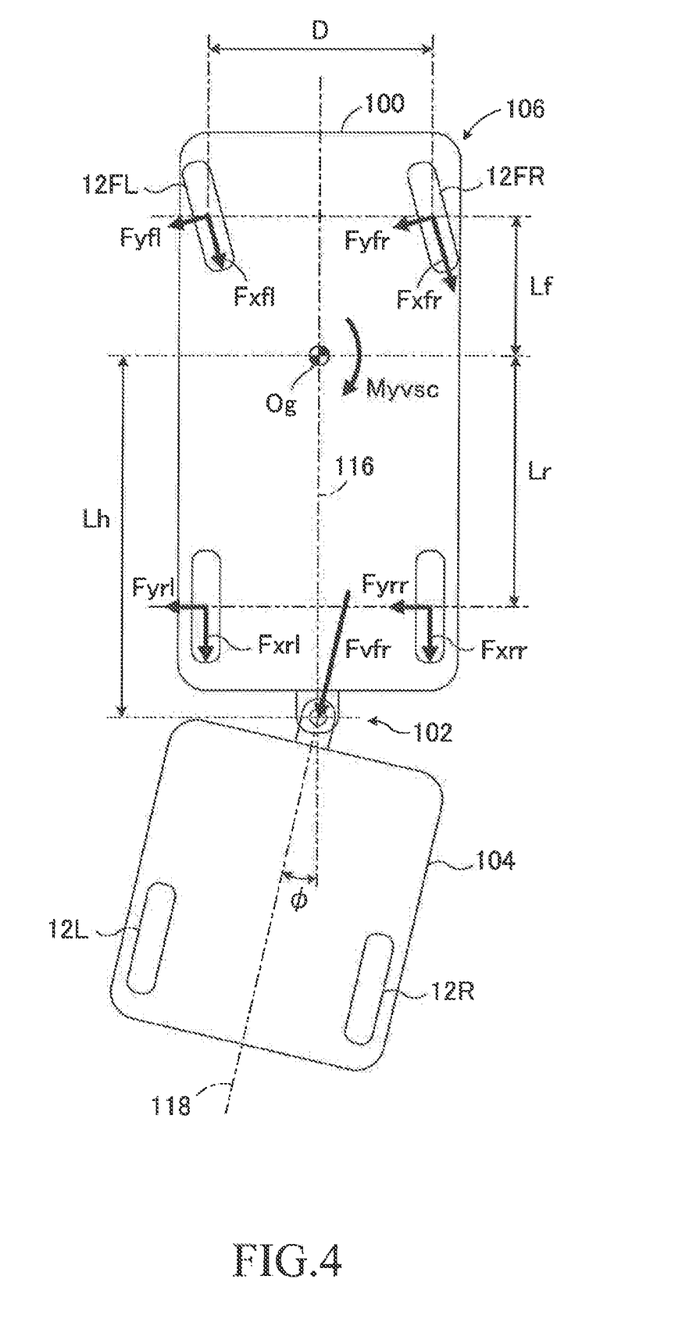
FIG. 4 is a plan view showing a state where braking forces are applied to all the wheels of the tractor vehicle by behavior control when turning left.

Note that as shown in FIG. 4, the hitch angle $\varphi$ is an angle formed by a longitudinal centerline 116 of the tractor vehicle 100 and a longitudinal centerline 118 of the trailer vehicle 104 as viewed from above and may be calculated in any manner known in the art. For example, as known procedures, the procedures described in U.S. Patent Publication No. 201400288769A1, U.S. Pat. No. 7,904,222B2, and U.S. Pat. No. 9,290,204B2 are known.

In step 60, an acting force Fvfr is calculated according to the following equation (3) in which If is a yaw moment of inertia of the tractor vehicle 100, Lh is a distance between the center of gravity Og of the tractor vehicle 100 and the pivot line 114 of the coupling device 102, and YRfd is a time derivative of an actual yaw rate YRf.

$$Fvfr = (If \cdot YRfd - Myvsc)/(Lh \cdot \sin \varphi) \quad (3)$$

In step 70, target additional braking forces Flat and Frat of the wheels 12L and 12R of the trailer vehicle 104 are each set to Fvfr/2.

In step 80, braking forces Fl and Fr of the wheels 12L and 12R are controlled by the braking device 14 so that additional braking forces Fla and Fra of the wheels 12L and 12R of the trailer vehicle 104 become the target additional braking forces Flat and Frat set in step 20 or 70.

<Behavior Control>

Next, the behavior control routine in the embodiment will be described with reference to the flowchart shown in FIG. 3. The control according to the flow chart shown in FIG. 3 (simply referred to as "behavior control") is also repeatedly executed at predetermined time intervals by the microcomputer of the ECU 16 when the ignition switch not shown is ON.

First, in step 110, as in step 10 of the flowchart shown in FIG. 2, a determination is made as to whether or not a braking force or braking forces is being applied to a predetermined wheel or wheels of the tractor vehicle 100 by the behavior control. When a negative determination is made, the behavior control proceeds to step 140, and when an affirmative determination is made, the behavior control proceeds to step 120.

In step 120, a determination is made as to whether or not an end condition of the application of the braking force or braking forces by the behavior control is satisfied. When a negative determination is made, the behavior control proceeds to step 150, and when an affirmative determination is made, the behavior control proceeds to step 130. The end condition is set in advance and stored in the ROM, such as "a spin state amount SS described later has become equal to or less than a control end reference value SSe (a positive constant)".

In step 130, a braking pressure of the predetermined wheel to which a braking force is applied by the behavior control is gradually reduced, whereby the application of the braking force to the predetermined wheel by the behavior control is ended.

In step 140, a determination is made as to whether or not a permission condition for applying a braking force or braking forces by the behavior control is satisfied. When a negative determination is made, the behavior control is temporarily ended without applying a braking force or braking forces by the behavior control, and when an affirmative determination is made, the behavior control proceeds to step 150. The permission condition such as "a vehicle speed V is equal to or higher than a reference value Ve (a positive constant) for permission determination" is set in advance and stored in the ROM.

In step 150, a spin state quantity SS indicating the degree of spin of the tractor vehicle 100 is calculated. The spin state quantity SS may be calculated in any manner known in the art.

In step 160, a determination is made as to whether or not the spin suppression control needs to be performed, for example, by determining whether or not the spin state quantity SS is equal to or greater than a control start reference value SSs (a positive constant greater than or equal to SSe). When a negative determination is made, the behavior control proceeds to step 180 without executing the spin suppression control, and when an affirmative determination is made, the behavior control proceeds to step 170.

In step 170, the spin suppression control is performed to reduce the degree of spin of the tractor vehicle 100 by reducing a yaw rate of the tractor vehicle and decelerating the tractor vehicle. For example, a target additional braking force of the turning outer front wheel which is a predetermined wheel is calculated so as to increase as the spin state quantity SS increases, and a braking pressure of the turning outer front wheel is controlled such that an additional braking force of the turning outer front wheel becomes the target additional braking force. Thus, a braking force is applied to the turning outer front wheel, but no braking force is applied to the other wheels.

In step 180, a drift-out state quantity DS indicating the degree of drift-out of the tractor vehicle 100 is calculated. The drift-out state quantity DS may also be calculated in any manner known in the art.

In step 190, a determination is made as to whether or not the drift-out suppression control needs to be performed, for example, by determining whether or not the drift-out state quantity DS is greater than or equal to a control start reference value DSs (a positive constant). When a negative determination is made, the behavior control is temporarily ended without performing the drift-out suppression control, and when an affirmative determination is made, the behavior control proceeds to step 200.

In step 200, the drift-out suppression control is performed to reduce the degree of drift-out of the tractor vehicle 100 by applying a yaw moment to the tractor vehicle to increase a yaw rate of the tractor vehicle and decelerating the tractor vehicle. For example, target additional braking forces of the turning outer rear wheel and the turning inner rear wheel, which are predetermined wheels, are calculated so as to increase as the drift-out state quantity DS increases. Then, braking pressures of the turning outer rear wheel and the turning inner rear wheel are controlled such that additional braking forces of the wheels become the corresponding target additional braking forces. Notably, braking forces are applied to the turning outer rear wheel and the turning inner rear wheel, but no braking force is applied to the other wheels.

Note that the spin suppression control and drift-out suppression control by the behavior control and application of their braking forces may be performed in any manner known in the art. For example, one example of the spin suppression control and drift-out suppression control by behavior control is described in Japanese Patent Application Laid-Open No. 2012-66659 as oversteer control and understeer control, respectively.

Operation of Embodiment

Figure 5A:
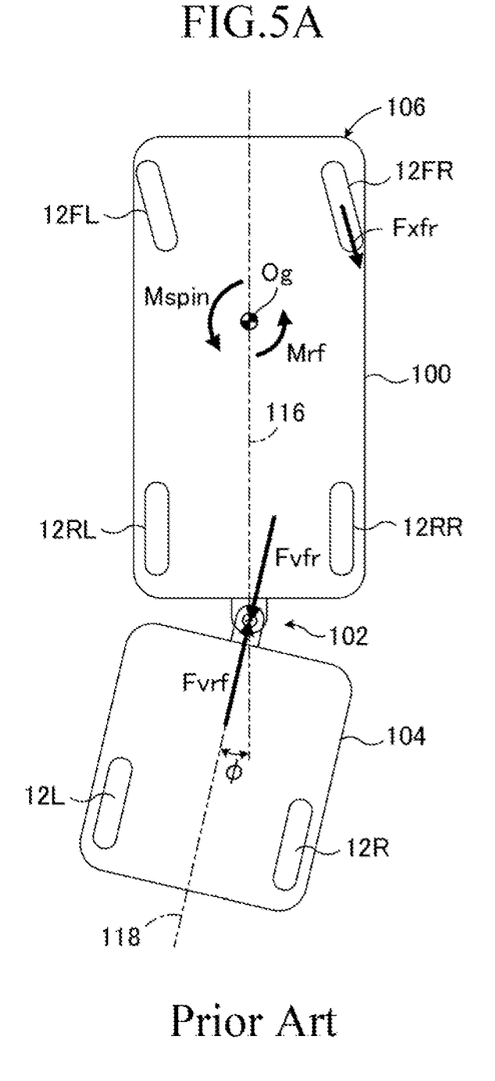
FIG. 5A is a plan view showing a situation where a braking force is applied to a right front wheel of a tractor vehicle by spin suppression control of behavior control when turning left, with respect to a conventional combination vehicle.
Figure 5B:
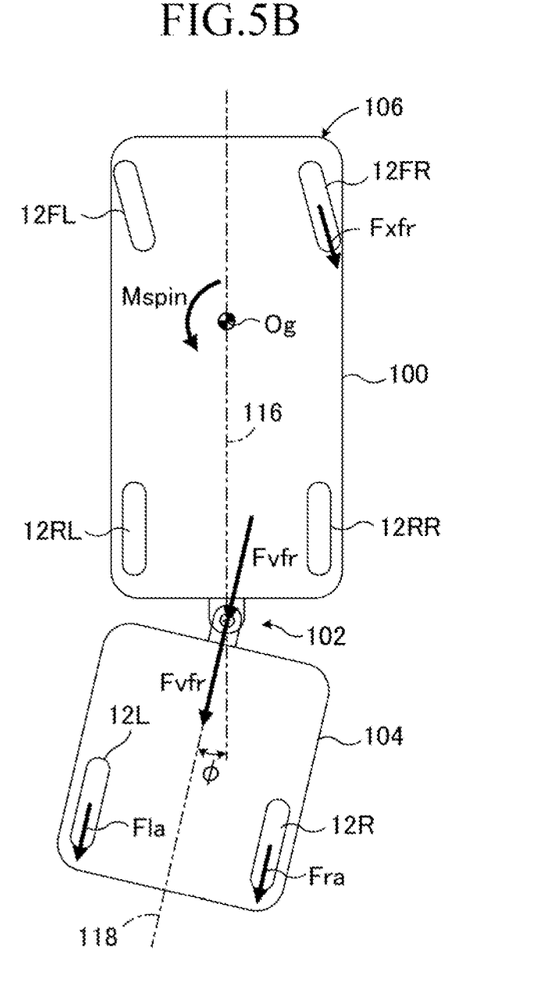
FIG. 5B is a plan view showing a situation where a braking force is applied to a right front wheel of a tractor vehicle by spin suppression control of behavior control when turning left, with respect to a combination vehicle to which the embodiment is applied.
Figure 6A:
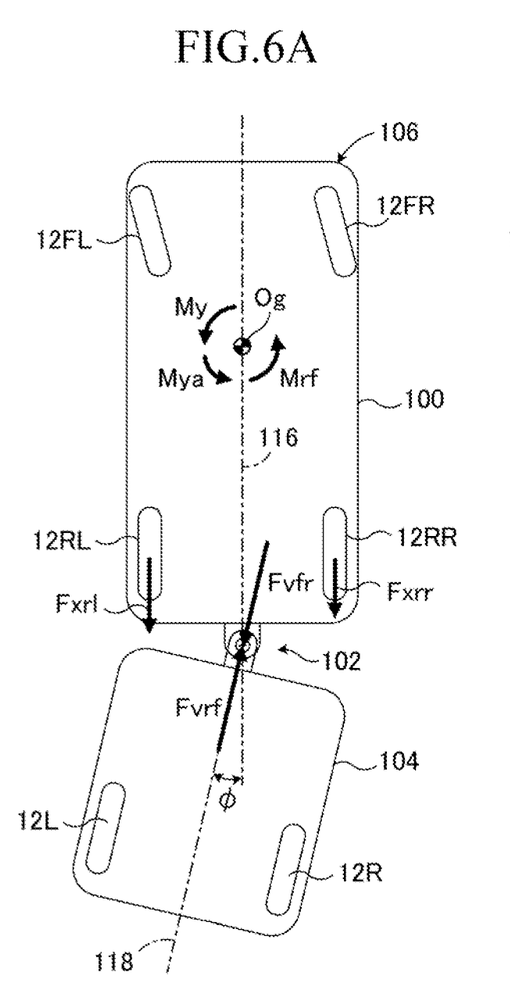
FIG. 6A is a plan view showing a situation where braking forces are applied to left and right rear wheels of the tractor vehicle by drift-out suppression control of behavior control when turning left, with respect to a conventional combination vehicle.
Figure 6B:
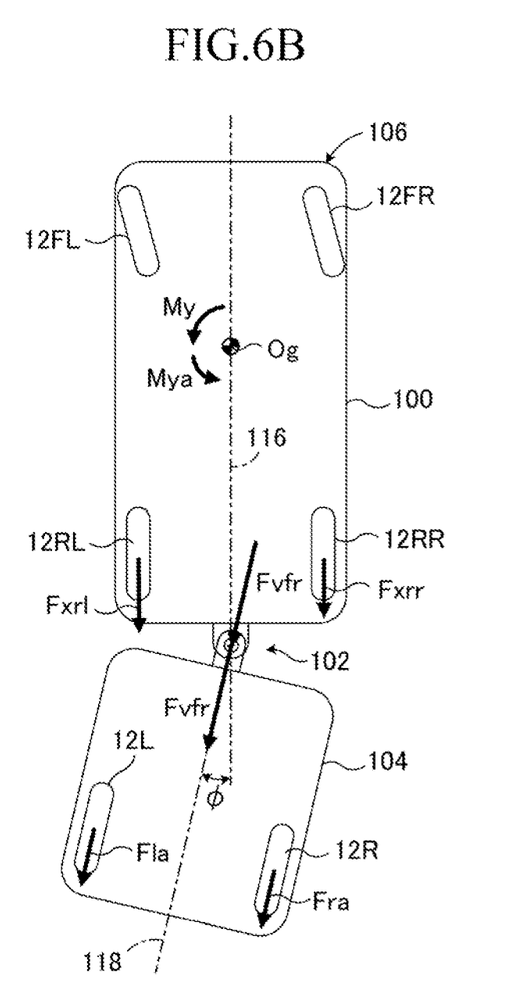
FIG. 6B is a plan view showing a situation where braking forces are applied to left and right rear wheels of the tractor vehicle by drift-out suppression control of behavior control when turning left, with respect to a combination vehicle to which the embodiment is applied.

Next, the operation of the braking control apparatus 10 configured as described above will be described referring to FIGS. 5 and 6 with respect to the cases where the tractor vehicle 100 is in a spin state and in a drift-out state, respectively, when turning left. In FIGS. 5 and 6, a braking force applied by the driver's braking operation or vehicle control other than the behavior control is omitted such that the spin state and the drift-out state of the tractor vehicle 100 can be easily understood. Further, although not shown in the drawings, the operation of the braking control apparatus 10 when the tractor vehicle 100 makes a right turn is the same as the operation when the tractor vehicle 100 makes a left turn, except that the directions such as left and right are opposite.

<In Spin State>

As shown in FIG. 5, when lateral forces Fyrl and Fyrr of the rear wheels 12RL and 12RR decrease while the combination vehicle 106 turns left and a spin moment Mspin acts on the tractor vehicle 100, a magnitude of a yaw rate YRf becomes excessive, sot that the tractor vehicle spins.

As a result, a negative determination and an affirmative determination are made in steps 110 and 140 of the flowchart shown in FIG. 3, respectively, and then an affirmative determination and a negative determination are made in steps 110 and 120, respectively. An affirmative determination is made in step 160, and the spin suppression control is performed in step 170. Therefore, a braking force Fxfr is applied to the turning outer front wheel, that is, the right front wheel, which is a predetermined wheel, such that a spin suppression moment against the spin moment Mspin is generated and the tractor vehicle is decelerated.

Thus, as compared to where the tractor vehicle 100 is not in the spin state and the braking force is not applied to the right front wheel, the tractor vehicle 100 decelerates with respect to the trailer vehicle 104 and an acting force Fvfr exerted by the tractor vehicle 100 on the trailer vehicle 104 through the coupling device 102 in the front-rear direction is increased. As a result, a reaction force Fvrf against the acting force Fvfr acts diagonally forward on the rear end of the tractor vehicle 100 from the trailer vehicle 104 through the coupling device 102. The acting force Fvfr and the reaction force Fvrf are the same in magnitude but opposite in direction.

As shown in FIG. 5A, since the reaction force Fvrf acts along the axis 118, a yaw moment Mrf in the same direction as the spin moment MSpin is generated around the center of gravity Og. Therefore, in a conventional combination vehicle, a hitch angle φ may be increased by the yaw moment Mrf caused by the reaction force Fvrf, and the hitch angle may become excessive.

On the other hand, in the embodiment, an affirmative determination is made in step 10 of the flowchart shown in FIG. 2, an acting force Fvfr is calculated in steps 30 to 60, and braking forces applied to the wheels 12L and 12R of the trailer vehicle 104 are each controlled to be Fvfr/2 in steps 70 and 80. Thus, as shown in FIG. 5B, a force Fvfr, which is a sum of the braking forces of the wheels 12L and 12R, acts on the coupling device 102 backward along the axis 118.

Accordingly, since the acting force Fvfr exerted on the trailer vehicle 104 by the tractor vehicle 100 through the coupling device 102 and its reaction force Fvrf become zero, the yaw moment Mrf acting in the same direction as the spin moment Mspin around the center of gravity Og is also zero. Therefore, according to the embodiment, even when a braking force is applied to the turning outer front wheel by the spin suppression control, the hitch angle φ can be prevented from increasing and becoming excessive due to the application of the braking force to the turning outer front wheel.

Figure 7:
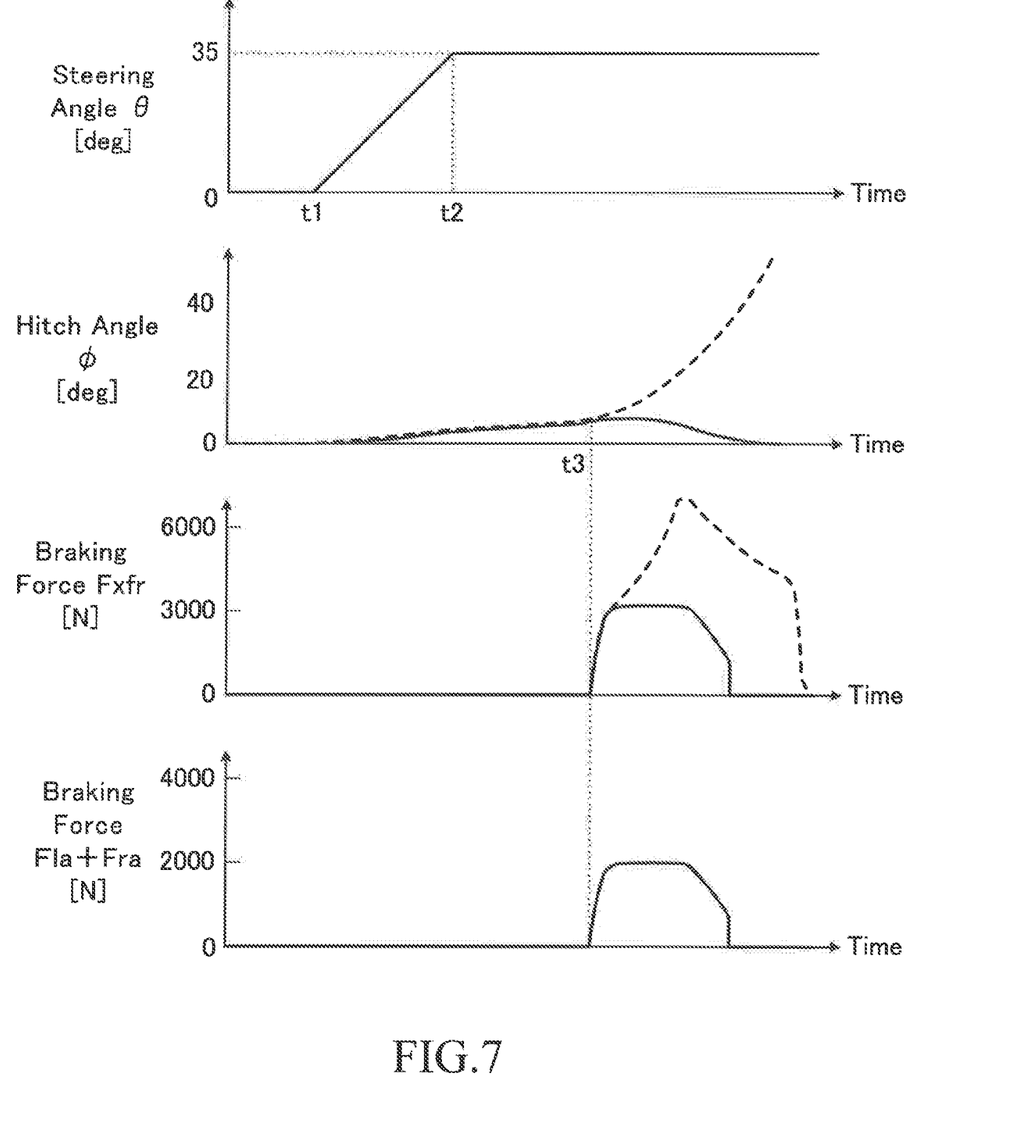
FIG. 7 is a time chart showing changes of a hitch angle φ and the like when a braking force is applied to the right front wheel of a combination vehicle by spin suppression control of behavior control when turning left in a conventional combination vehicle (dotted line) and the embodiment (solid line).

For example, FIG. 7 is a time chart which shows an example of changes of the hitch angle φ, a braking force Fxfr applied to the right front wheel of the tractor vehicle 100, and a sum Fla+Fra of braking forces of the left and right wheels of the trailer vehicle 104 for a transition state from a straight ahead state to a steady left turn state.

It is assumed that as shown in FIG. 7, at time point t1, a steering angle θ starts to increase at a constant increase rate of 13.5 deg/s, and after time point t2, the steering angle θ becomes a constant value 35 deg, and at time point t3, the spin suppression control is started. A vehicle speed V is 80 km/h, and a friction coefficient of a road surface is 0.8 (dry road surface).

At time point t3, the braking force Fxfr applied to the right front wheel by the spin suppression control rapidly increases. In a conventional combination vehicle on which the braking control apparatus 10 of the present invention is not implemented, as shown by the broken line in FIG. 7, by applying the braking force to the right front wheel, an acting force Fvfr and a reaction force Fvrf are generated as described above. As a result, the hitch angle φ is increased, the spin state is deteriorated, and the spin state quantity SS is increased. Therefore, the braking force applied to the right front wheel is increased, and the hitch angle φ is likely to be excessive due to these repetitions.

On the other hand, according to the embodiment, when an acting force Fvfr is generated by applying the braking force Fxfr to the right front wheel, the braking forces Fla and Fra applied to the wheels 12L and 12R are controlled such that a braking force Fla+Fra that is the same as the acting force Fvfr acts on the trailer vehicle 104 as shown in the lowermost stage in FIG. 7. As shown by the solid line in the second stage of FIG. 7, the hitch angle φ does not increase and the spin state is settled, so that the braking force Fxfr applied to the right front wheel decreases and the hitch angle φ does not become excessive.

<In Drift-Out State>

As shown in FIG. 6A, when lateral forces Fyfl and Fyfr (not shown) of the front wheels 12FL and 12FR are insufficient while the combination vehicle 106 is turning left and the yaw moment My of the tractor vehicle 100 is insufficient, a magnitude of a yaw rate YRf becomes too small, so that the tractor vehicle drifts out.

As a result, a negative determination and an affirmative determination are made in steps 110 and 140, respectively of the flowchart shown in FIG. 3, and then an affirmative determination and a negative determination are made in steps 110 and 120, respectively. A negative determination is made in step 160, an affirmative determination is made in step 190, and the drift-out suppression control is performed in step 200. Therefore, braking forces Fxrl and Fxrr are applied to the left and right rear wheels, which are predetermined wheels, such that the tractor vehicle is decelerated and a yaw moment Mya in the turn assist direction is generated.

Therefore, as compared to where the tractor vehicle 100 is not in a drift-out state and braking forces are not applied to the left and right rear wheels, an acting force Fvfr exerted on the trailer vehicle 104 by the tractor vehicle 100 in the front-rear direction is increased. As a result, a reaction force Fvrf of the acting force Fvfr acts on the tractor vehicle 100 from the trailer vehicle 104 through the coupling device 102.

As shown in FIG. 6A, since the reaction force Fvrf acts along the axis 118, a yaw moment Mrf in the direction of increasing the yaw rate YRf of the tractor vehicle 100 is generated around the center of gravity Og. Therefore, in a conventional combination vehicle, as in a spin state, an extra yaw rate is generated by the yaw moment Mrf caused by the reaction force Fvrf, and as a result, the hitch angle φ may be increased to become excessive.

On the other hand, in the embodiment, an affirmative determination is made in step 10 of the flowchart shown in FIG. 2, and as in the spin state, in steps 30 to 80, the braking forces Fla and Fra applied to the wheels 12L and 12R of the trailer vehicle 104 are each controlled to be a half of the acting force Fvfr. Thus, as shown in FIG. 6B, a braking force Fvfr, which is a sum Fla+Fra of the braking forces applied to the wheels 12L and 12R, acts backward on the coupling device 102 along the axis 118.

Therefore, since the reaction force Fvrf of the acting force Fvfr exerted on the trailer vehicle 104 by the tractor vehicle 100 through the coupling device 102 becomes zero, the yaw moment Mrf acting on the tractor vehicle 100 around the center of gravity Og in the direction to increase the yaw rate YRf also becomes zero. Therefore, according to the embodiment, even when the braking forces are applied to the left and right rear wheels by the drift-out suppression control, the hitch angle φ can be prevented from increasing and becoming excessive due to the braking forces being applied to the left and right rear wheels.

As understood from the above description, according to the embodiment, the same braking force as the force Fvfr exerted on the trailer vehicle 104 by the tractor vehicle 100 due to the application of a braking force or braking forces to a predetermined wheel or wheels by the spin suppression control or the drift-out suppression control is applied to the trailer vehicle. Therefore, the hitch angle φ of the combination vehicle 106 can be prevented from becoming excessive due to the application of a braking force or braking forces to a predetermined wheel or wheels and the trailer vehicle pressing the rear end of the tractor vehicle diagonally forward through the coupling device.

In particular, according to the embodiment, braking forces applied to the wheels 12L and 12R of the trailer vehicle 104 are controlled to be a half of the acting force Fvfr, such that the braking force of the trailer vehicle 104 is the same as the acting force Fvfr. Therefore, the possibility that the hitch angle φ of the combination vehicle 106 is increased to be excessive can be effectively reduced as compared to where braking forces applied to wheels 12L and 12R of the trailer vehicle 104 are controlled to braking forces smaller than a half of the acting force Fvfr.

It is to be noted that when a sum of the braking forces of the trailer vehicle 104 exceeds the acting force Fvfr, the trailer vehicle exerts a force in the direction to decelerate the tractor vehicle through the coupling device. Therefore, there is a possibility that hitch angle φ of the combination vehicle 106 decreases and becomes too small, and there is also a possibility that stabilization of turning behavior of the tractor vehicle cannot be appropriately performed due to excessive deceleration of the tractor vehicle 100.

On the other hand, if a braking force of the trailer vehicle 104 is equal to or less than the acting force Fvfr, the risk of the hitch angle of the combination vehicle becoming excessive can be reduced while avoiding that the turning behavior of the tractor vehicle is not stabilized appropriately due to excessive deceleration of the tractor vehicle. Therefore, braking forces applied to the wheels 12L and 12R of the trailer vehicle based on the acting force Fvfr are preferably Fvfr/2 or less. In other words, braking force applied to the trailer vehicle is preferably equal to or less than the acting force.

Further, according to the embodiment, a hitch angle φ of the combination vehicle 106 is calculated, and a yaw moment Myvsc acting around the center of gravity Og of the tractor vehicle 100 due to a braking force or braking forces applied to a predetermined wheel or wheels is calculated, and an acting force Fvfr is calculated based on the hitch angle and the yaw moment. Therefore, as compared to where an acting force Fvfr is calculated as a component along the centerline 118 of the braking force or braking forces applied to the predetermined wheel or wheels, for example, the acting force Fvfr can be accurately calculated and braking forces applied to the wheels of the trailer vehicle 104 can be appropriately controlled, and the risk that the hitch angle φ becomes excessive can be appropriately reduced.

Further, according to the embodiment, a yaw moment Myvsc provided for the calculation of a acting force Fvfr is calculated in consideration of lateral forces Fyi of the wheels of the tractor vehicle 100 when a braking force or braking forces is applied to a predetermined wheel or wheels. Therefore, as compared to where a yaw moment Myvsc is calculated without considering lateral forces Fyi of the wheels, an acting force Fvfr can be accurately calculated, and the risk that the hitch angle φ increases and becomes excessive can be appropriately reduced.

Further, according to the embodiment, braking forces applied to the wheels 12L and 12R of the trailer vehicle 104 are identical to each other. Consequently, no yaw moment is given to the trailer vehicle 104 by the braking forces applied to the wheels 12L and 12R. Therefore, it is possible to prevent that a yaw moment to be given to the tractor vehicle 100 by the behavior control is adversely affected by applying braking forces to the wheels of the trailer vehicle 104 and the behavior control is not appropriately performed.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiments, when a braking force or braking forces is applied to a predetermined wheel or wheels of the tractor vehicle 100 by the behavior control, braking forces of the wheels 12L and 12R of the trailer vehicle 104 are each controlled to be Fvfr/2, so that a braking force of the entire trailer vehicle is the same as the acting force Fvfr. However, as long as braking forces according to an acting force Fvfr are applied to the wheels of the trailer vehicle 104, the braking forces may be smaller than Fvfr/2 and a braking force of the whole trailer vehicle may be smaller than the acting force Fvfr. In that case as well, in a situation where a braking force or braking forces is applied to a predetermined wheel or wheels of the tractor vehicle 100 by the behavior control, the possibility that a hitch angle φ of the combination vehicle 106 becomes excessive can be reduced.

Further, in the above-described embodiments, a yaw moment Myvsc utilized in the calculation of an acting force Fvfr is calculated in consideration of lateral forces Fyi of the wheels of the tractor vehicle when a braking force or braking forces is applied to a predetermined wheel or wheels. However, a yaw moment Myvsc may be calculated based on only a braking force or braking forces applied to a predetermined wheel or wheels without considering lateral forces Fyi of the wheels.

Further, in the above-described embodiments, braking forces of the wheels 12L and 12R of the trailer vehicle 104 are each controlled to be the same Fvfr/2 as each other. However, the braking forces of the left and right wheels of the trailer vehicle 104 may be controlled to be different values. In that case, it is preferable that the braking forces of the left and right wheels be controlled such that their sum becomes the same value as an acting force Fvfr.

Further, in the above-described embodiments, braking forces of the wheels 12L and 12R of the trailer vehicle 104 are controlled by the braking device 14 that controls the braking forces of the four wheels of the tractor vehicle 100. However, the braking forces of the wheels of the trailer vehicle 104 may be controlled by a braking device other than the braking device 14. In that case, the other braking device is also controlled by the ECU 16, but the other braking device may be a non-hydraulic braking device such as a braking device utilizing a pressure of exhaust gas of the tractor vehicle 100.

Further, in the above-described embodiments, although the spin suppression control and the drift-out suppression control are performed as behavior control, one of the spin suppression control and the drift-out suppression control may be omitted.

What is claimed is:

1. A braking control apparatus for a combination vehicle which includes a tractor vehicle and a trailer vehicle coupled to the tractor vehicle by a coupling device pivotally relative to the tractor vehicle as viewed from above, the braking control apparatus comprising a braking device for applying braking forces to wheels of the tractor vehicle and wheels of the trailer vehicle, and a control unit that controls the braking device, the control unit being configured to perform behavior control for stabilizing the turning behavior of the tractor vehicle by applying at least one braking force to at least one predetermined wheel of the tractor vehicle when the turning behavior of the tractor vehicle is not stable, wherein the control unit is configured to control the braking device such that when the at least one braking force is applied to the at least one predetermined wheel by the behavior control, braking forces are applied to the wheels of the trailer vehicle according to a force that the tractor vehicle acts on the trailer vehicle through the coupling device due to the application of the at least one braking force to the at least one predetermined wheel, wherein the control unit is configured to calculate a yaw moment acting around a center of gravity of the tractor vehicle based on the at least one braking force of the at least one predetermined wheel and lateral forces of the wheels of the tractor vehicle when the at least one braking force is applied to the at least one predetermined wheel.

2. The braking control apparatus according to claim 1, wherein the control unit is configured to estimate a force acting in the front-rear direction of the trailer vehicle through the coupling device due to the application of the at least one braking force to the at least one predetermined wheel and to control the braking device such that a sum of braking forces applied to the wheels of the trailer vehicle is less than or equal to the force acting in the front-rear direction.

3. The braking control apparatus according to claim 2, wherein the control unit is configured to calculate a hitch angle of the combination vehicle, and calculate a force acting in the front-rear direction based on the hitch angle and the yaw moment.

4. The braking control apparatus according to claim 1, wherein the trailer vehicle has left and right wheels, and an equal braking force is applied to each of the left and right wheels.

* * * * *